Nov. 9, 1965  W. G. DE VERTER  3,216,642
WAVE-TYPE SOLDER FOUNTAIN
Filed March 22, 1962  2 Sheets-Sheet 1
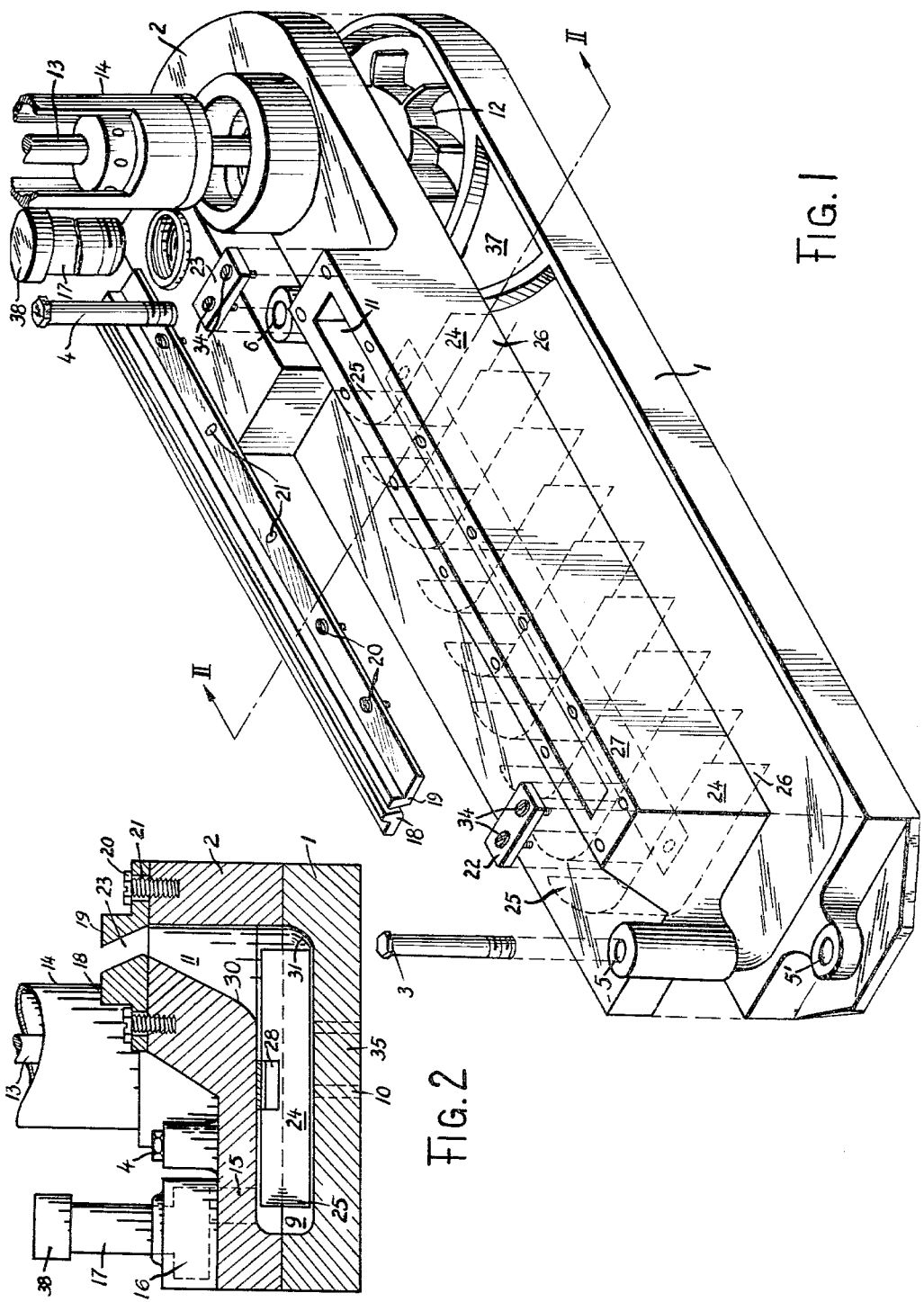

Nov. 9, 1965    W. G. DE VERTER    3,216,642
WAVE-TYPE SOLDER FOUNTAIN
Filed March 22, 1962    2 Sheets-Sheet 2

United States Patent Office 3,216,642
Patented Nov. 9, 1965

3,216,642
WAVE-TYPE SOLDER FOUNTAIN
Walton G. De Verter, 1708 W. Belmont Ave., Chicago, Ill.
Filed Mar. 22, 1962, Ser. No. 181,523
5 Claims. (Cl. 228—37)

This invention relates in general to solder fountains, and in particular to wave-type solder fountains in which a longitudinal stationary wave of molten solder is continuously generated. Its principal object is to provide a new and improved solder fountain of the above character in which the volume of the molten solder in the generated wave is constant and in which the crest of the generated wave is uniform throughout its length.

Numerous soldering methods and techniques have been employed in mass production soldering operations. For example, in soldering printed circuit boards, dip-soldering, brush-soldering jet-stream soldering are some of the well-known soldering methods employed. In dip-soldering, the underside of a printed circuit board is immersed in a static pool of molten solder for a short period of time; in brush-soldering, a quantity of molten solder is carried upwards out of a pool of molten solder by a rotating brush and deposited, by a wiping action, on the underside of a printed circuit board; and in jet-stream soldering, a substantially circular stream of molten solder is directed against the underside of a moving printed circuit board.

While these soldering methods have found substantial commercial acceptance, they are subject to numerous disadvantages. Printed circuit boards solder-coated by the dip-solder process have dross and oxides from the surface of the molten pool clinging to the soldered terminals; have closely spaced terminals soldered together by an undesirable globule of solder; or have tails or icicles protruding from the soldered terminals. Printed circuit boards soldered by the brush solder process are subject to solder joint weaknesses as the noted brushing action results in insufficient amounts of solder adhering to the terminals. The terminals on printed circuit boards soldered by the jet-stream process are quite satisfactory but this process does not enhance mass production soldering operations since the board must be passed over the jet stream several times in order to solder a large number of randomly spaced terminals.

Another soldering process is known which utilizes a device containing a plurality of individual jet streams closely spaced together and aligned in a row. The jet streams become integrated and form a longitudinal stationary molten solder wave. A printed circuit board is passed across the crest of this solder wave at right angles to the longitudinal axis of the wave, so that all terminals are soldered regardless of their random spacing. This multi-jet stream device has the disadvantage that the amplitude of the wave varies throughout its length as a result of varying pressures at each of the jet stream nozzles. While this disadvantage can be overcome by providing separate pressure generating devices at each jet nozzle, such devices becomes necessarily complex and costly.

One variation of this multi-jet device is known in which the jet nozzles comprise a series of closely spaced apertures along the axis of a hollow cylinder which is closed at one end and has an impeller pump located at the other end for forcing molten solder into the cylinder. This device is subject to the same disadvantage that accompanies jet-stream systems in that the crest of the solder wave is not uniform throughout its length. Also, such device is limited to solder coating narrow printed circuit board since the irregularities in the solder wave crest are increased as the length of the wave is increased. Another disadvantage is that this multi-jet device is readily subject to clogging since the jet nozzles must be quite small to create a satisfactory jet stream.

The disadvantages present in all of the foregoing processes, systems and devices, are overcome by the present invention.

It is an object of the present invention to provide an impeller-driven wave-type solder fountain in which the molten solder is driven through an orifice of the same dimensions as the cross section dimensions of the stationary molten solder wave.

A feature concerned with carrying out the above object resides in the arrangement wherein the orifice dimensions can be readily adjusted to provide a molten solder wave suitable for the particular soldering operation to be performed.

Another object is to provide an impeller-driven wave-type solder fountain in which the crest of the stationary molten solder wave is uniform throughout its length.

A related feature resides in the arrangement wherein a plurality of individual diversion means are provided which are separately adjustable to increase or decrease the amplitude of the wave crest at any point along its length.

A further object is to provide an impeller-driven wave-type solder fountain in which the levelness of the crest of the stationary solder wave is independent of the length of the wave.

A feature concerned with the last said object resides in the arrangement wherein the noted plurality of solder diversion means extend the entire length of the wave orifice and are adjustable to balance the amplitude of the wave crest throughout its length.

Other objects and features of the invention will become apparent and the invention will be best understood when the following specification is read in conjunction with the accompanying drawings comprising FIGS. 1 to 4 in which:

FIG. 1 shows an exploded view of the solder fountain of the invention showing a two-section housing;

FIG. 2 shows a cross-sectional view of the solder fountain of FIG. 1 taken along lines II—II;

Figure 3:
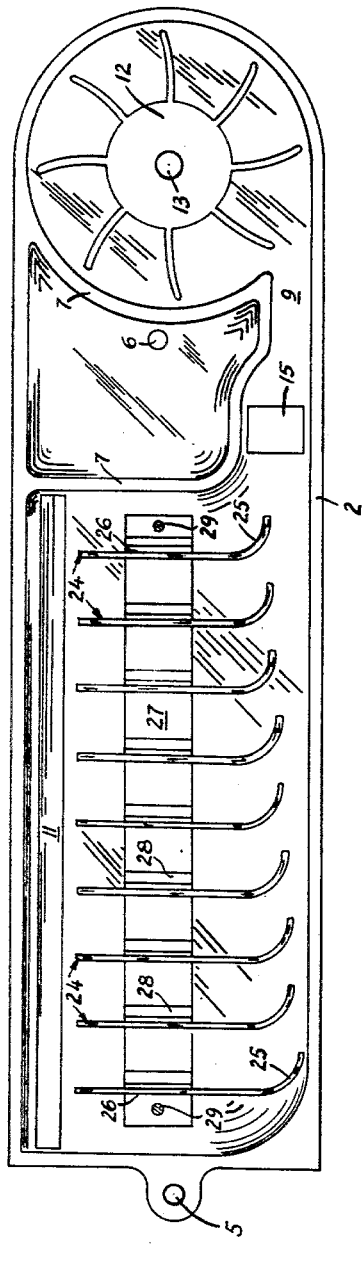
FIG. 3 shows a bottom plan view of the upper section of the solder fountain of FIG. 1.

Referring now to the drawings, a description of the operation of the solder fountain of the invention will be given. It is to be understood that the device is to be immersed into a pot of molten solder.

Figure 4:
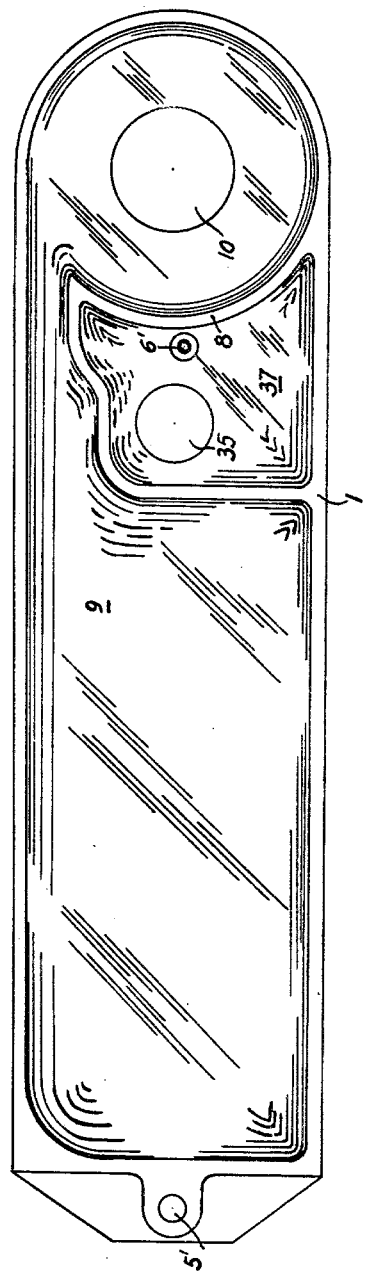
FIG. 4 shows a top plan view of the lower section of the solder fountain of FIG. 1.

The solder fountain comprises a housing having a lower section 1 and a mating upper section 2, each having a concave interior and arranged to be secured tightly together by bolts 3 and 4 passing through openings 5 and 6 in the upper section 2 into properly oriented tapped openings 5' and 6' in lower section 1. As best shown in FIGS. 3 and 4, the interior of each section is divided into an input chamber and an output chamber by separating wall 7 in the upper section 2 and respectively corresponding separating wall 8 in the lower section 1. These walls are of a configuration which define an opening 9 between the two chambers. The input chamber has an inlet 10 (FIG. 4) in the base of the lower section 1 and the output chamber has an outlet 11 in the top of the upper section 2. In operation, molten solder from the solder pot is drawn into the input chamber through inlet 10, and is driven through opening 9 between the two chambers and out of outlet 11.

An impeller 12 is fixedly secured to shaft 13 and is rotatably supported in the inlet chamber by column 14. The shaft 13 has a pulley attached thereto which may be driven by any suitable motor means causing the rotation of impeller 12 in a direction forcing molten solder from the input chamber to the output chamber. The mating surfaces of sections 1 and 2 are suitably machined to preclude leakage of molten solder therebetween.

Upper section 2 has an aperture 15 located above the opening 9 between the two chambers as can be clearly seen in FIGS. 2 and 3. This aperture 15 connects the opening 9 with a small chamber 16 formed as part of the upper section 2. A vertical hollow cylinder 17 closed at one end by a suitable cap 38 and secured to chamber 16, preferably by screw threads, cooperates with chamber 16 to form an air accumulator for cushioning purposes. Variations in the pressure created in the input and output chambers by impeller 12 are thus nullified resulting in substantially uniform pressure at the outlet 11. While the accumulator is shown as comprising a chamber 16 having the hollow cylinder 17 and aperture 15 spaced apart, and having the aperture 15 located in the chamber opening 9, it is to be understood that any other locations and combination of elements could be used satisfactorily.

Outlet 11 is an elongated narrow aperture extending the entire length of the output chamber. In operation, impeller 12 forces molten solder through outlet 11 with sufficient force to cause the molten solder to spurt vertically out of the output chamber in the form of an elongated wave. The crest of the wave may then separate with portions of molten solder falling to the right and left of the zenith of outlet 11.

Two elongated blades 18 and 19 are secured to the face of upper section 2 above the outlet 11 by a series of screws 20 passing through respective openings 21 in both blades. The openings 21 are elongated to permit the adjustment of the blades 18 and 19 towards and away from each other.

The blades 18 and 19 have oppositely slanted surfaces which cooperate to define an orifice which is directed at an angle from the vertical. The end sections 22 and 23 are positioned in abutting relation to the ends of the blades 18 and 19 to define the length of the orifice. With a slanted orifice, the wave of molten solder is generated at an angle and the resulting wave crest is uniform since the noted separation of the crest on a true vertical wave is absent. The noted adjustment of the blades 18 and 19 towards or away from each other controls the height of the solder wave under constant pressure conditions.

As will be seen most clearly in FIG. 1 and FIG. 3, one end of the orifice at outlet 11 is near the opening 9 between the two chambers while the other end of the orifice is remotely located therefrom. This difference in distances would normally result in the crest of the wave of molten solder near the two orifice ends being of different amplitudes. To overcome this wave crest amplitude difference, a plurality of evenly spaced different-length distributor vanes 24 are positioned in the output chamber. Each of the vanes 24 is of a height equal to the inside dimensions of the output chamber and each has a curved section 25 and a straight section 26, with the straight sections each being of different length. The end portion of each of the straight sections 26 are aligned and spaced as shown in FIG. 3. The curved section 25 of the end vane 24 nearest the input chamber is located at one side of the path defined by opening 9 and the curved section of the end vane located furthest from the input chamber is located at the other side of the path defined by opening 9. The intermediate vanes 24 are aligned between these two noted end vanes.

A bar 27 extends along the top of all the vanes and is secured by any suitable means, such as welding or right angle supports 28. This unitary structure of all the vanes is secured to the upper section 2 of the solder fountain housing by screws 29. While these vanes are secured to a common bar 27, it is clear that they could be secured to the upper section 2 by individual means.

As most clearly seen in FIG. 3, the curved portion 25 of each vane 24 extends into the path of molten solder being forced through opening 9 and by suitable adjustment, such as bending, each vane can be adjusted to deflect the same amount of molten solder. The deflected molten solder is then driven through the orifice associated with outlet 11 with each portion of the orifice passing the same quantity of molten solder. As a result thereof, the crest of the generated wave is constant throughout its length, or varied as desired, according to the adjusted position of the curved section of vanes 24.

Referring now to FIG. 2 of the drawings, the cross-sectional view of the solder fountain shows the upper section 2 having a curved portion 30 and lower section 1 having a correspondingly curved portion 31. These curved portions cause the molten solder deflected by distributor vanes 24 to be deflected upwardly and out of the orifice associated with outlet 11.

The combination of the deflection of the molten solder by the curved portions 25 and the portions 30 and 31 results in a smooth agitation-free flow of molten solder from the inlet 10 to the outlet 11 with the noted air accumulator compensating for pressure variations. The resulting stationary wave of molten solder is steady, of uniform thickness and has a wave crest uniform throughout its length.

As the result of the configuration of the input and output chambers, an intermediate chamber 37 is formed. The pressure created by the impeller 12 may result in some molten solder being forced between the abutting walls 7 and 8. Under such circumstances, the sections 1 and 2 could not be easily separated since the solder in chamber 37 would have become solidified. To preclude molten solder from being trapped in the intermediate chamber 37, it is provided with drain hole 35 permitting free passage of molten solder both into and out of chamber 35.

While I have disclosed my invention in connection with specific apparatus and applications, it is to be clearly understood that this description is made only by way of example and not as a limitation on the scope of the invention.

I claim:

1. A wave-type solder fountain comprising a first chamber and a second chamber interconnected therewith, an inlet in said first chamber and an outlet in said second chamber, orifice means associated with said outlet, means for forcing molten solder to flow through said inlet and said first chamber to said second chamber, through said second chamber and out of said outlet and associated orifice means in the form of a continuous stationary wave, first diversion means in the second chamber for diverting the direction of said flow between the first and the second chambers and second diversion means in the second chamber for diverting the direction of said flow in the second chamber towards the said outlet, and channeling means for restricting the said flow from the said first chamber to the said second chamber in a horizontal direction and in a defined path, the said first diversion means including a plurality of separate diversion elements each diverting molten solder flowing in a different portion of said defined path.

2. A wave-type solder fountain as set forth in claim 1 wherein the said plurality of elements each divert the direction of flow of molten solder at substantially right angles to the said defined path and in the same plane therewith.

3. A wave type solder fountain as set forth in claim 1 wherein the said plurality of elements comprise evenly spaced vanes of different lengths positioned in increasing order of lengths with the shortest being located nearest the beginning of said defined path.

4. A wave-type solder fountain as set forth in claim 1 wherein said orifice means are positioned over said outlet to direct the said flow therethrough at angles from the vertical to generate a continuous and single stationary wave at the side of said outlet.

5. A wave-type solder fountain as set forth in claim 4 wherein said orifice means includes adjustable means for varying the cross-sectional area of said generated stationary wave to vary the amplitude of said wave.

References Cited by the Examiner

UNITED STATES PATENTS

| | | | |
|---|---|---|---|
| 157,256 | 11/74 | Wiard | 122—414 |
| 1,507,575 | 9/24 | Brouse | 308—36.2 |
| 2,355,390 | 8/44 | Murphy | 308—36.2 |
| 2,469,392 | 5/49 | Jones et al. | 113—126 X |
| 2,895,683 | 7/59 | Dvorak | 113—126 X |
| 2,965,314 | 12/60 | Salomon | 239—553 |
| 2,993,272 | 7/61 | Carlzen et al. | 113—126 X |
| 3,037,274 | 6/62 | Hancock | 113—126 X |
| 3,039,185 | 6/62 | Oates | 113—126 X |
| 3,056,370 | 10/62 | Barnes et al. | 113—126 |

FOREIGN PATENTS 712,109 7/54 Great Britain.

WHITMORE A. WILTZ, *Primary Examiner.*

JOHN F. CAMPBELL, CHARLES W. LANHAM,
*Examiners.*